US010410421B2

(12) United States Patent
Kim

(10) Patent No.: US 10,410,421 B2
(45) Date of Patent: Sep. 10, 2019

(54) METHOD AND SERVER FOR PROVIDING VIRTUAL REALITY IMAGE ABOUT OBJECT

(71) Applicant: NEXT AEON INC., Seoul (KR)

(72) Inventor: Gyu Hyon Kim, Seoul (KR)

(73) Assignee: 3I, CORPORATION, Daegu (KR)

( * ) Notice: Subject to any disclaimer, the term of this patent is extended or adjusted under 35 U.S.C. 154(b) by 0 days.

(21) Appl. No.: 15/350,523

(22) Filed: Nov. 14, 2016

(65) Prior Publication Data
US 2018/0075656 A1 Mar. 15, 2018

(30) Foreign Application Priority Data

Sep. 13, 2016 (KR) .................. 10-2016-0118089
Sep. 30, 2016 (KR) .................. 10-2016-0126277

(51) Int. Cl.
G06T 19/00 (2011.01)
G06F 3/00 (2006.01)
H04N 5/232 (2006.01)
G06F 3/01 (2006.01)
G06Q 30/06 (2012.01)
G06F 3/0488 (2013.01)
G06F 3/0482 (2013.01)
H04N 7/18 (2006.01)

(52) U.S. Cl.
CPC .......... *G06T 19/006* (2013.01); *G06F 3/011* (2013.01); *G06F 3/013* (2013.01); *G06F 3/0482* (2013.01); *G06F 3/04883* (2013.01); *G06Q 30/0643* (2013.01); *H04N 5/23238* (2013.01); *H04N 7/18* (2013.01)

(58) Field of Classification Search
CPC ............................... G06T 19/006; G06F 3/011
USPC ........................................................ 345/633
See application file for complete search history.

(56) References Cited

U.S. PATENT DOCUMENTS

| 2009/0225001 | A1* | 9/2009 | Biocca | G02B 27/0172 345/8 |
| 2010/0123737 | A1* | 5/2010 | Williamson | G01C 21/3647 345/672 |
| 2013/0022950 | A1* | 1/2013 | Muniz Simas | G09B 7/02 434/238 |
| 2013/0286206 | A1* | 10/2013 | Ozaki | H04N 7/18 348/148 |
| 2014/0272810 | A1* | 9/2014 | Fields | G09B 19/14 434/65 |

* cited by examiner

Primary Examiner — Hai Tao Sun
(74) Attorney, Agent, or Firm — Cantor Colburn LLP

(57) ABSTRACT

A method and a server for providing a virtual reality image about an object are provided. To elaborate, the method includes receiving a lookup request for a virtual reality image about an object selected by a user from a user device; and providing a virtual reality image including one or more 360-degree images corresponding to the object to the user device, herein the 360-degree image includes image data about views from multiple directions from a photographing location of the image.

18 Claims, 15 Drawing Sheets
(2 of 15 Drawing Sheet(s) Filed in Color)

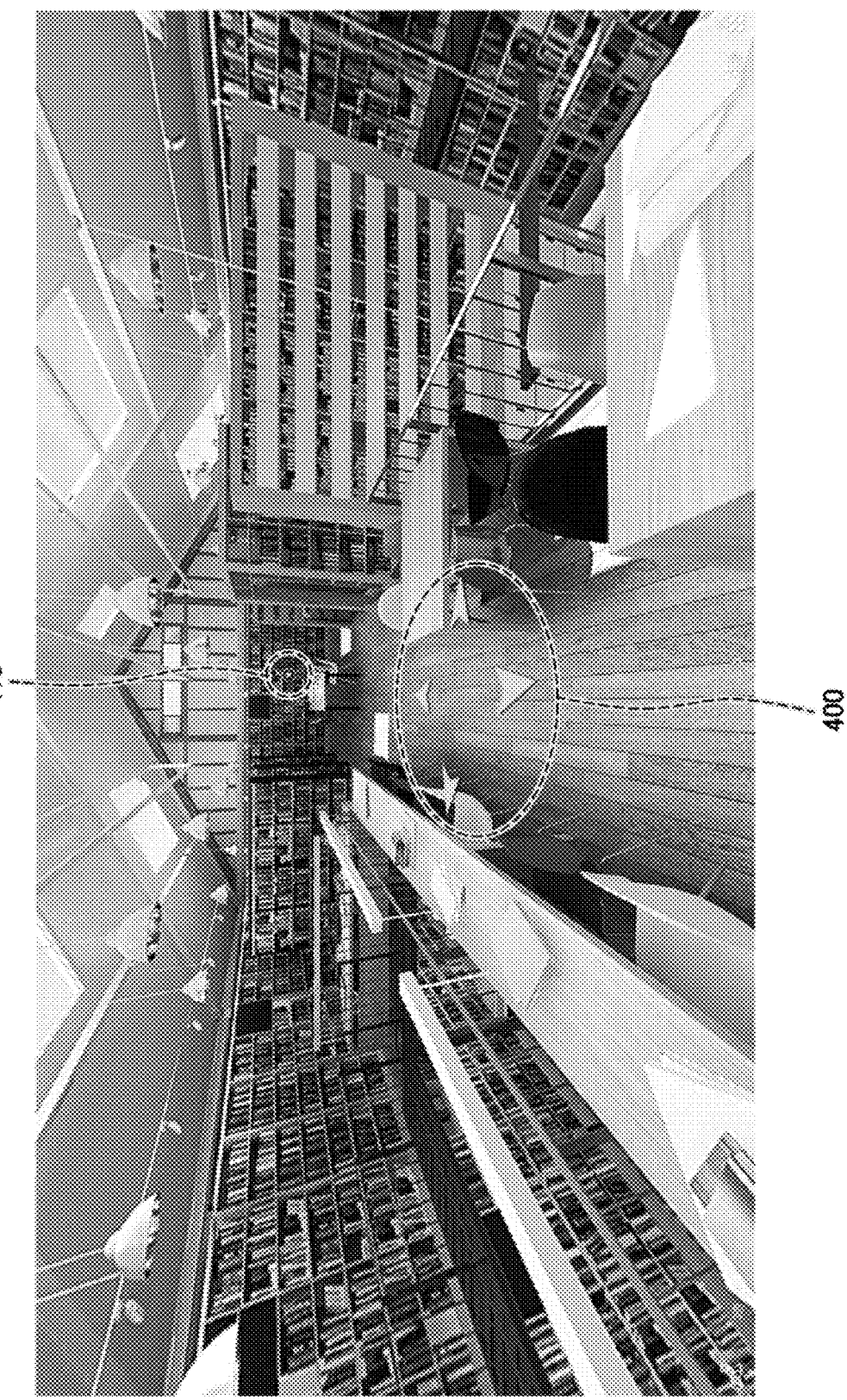

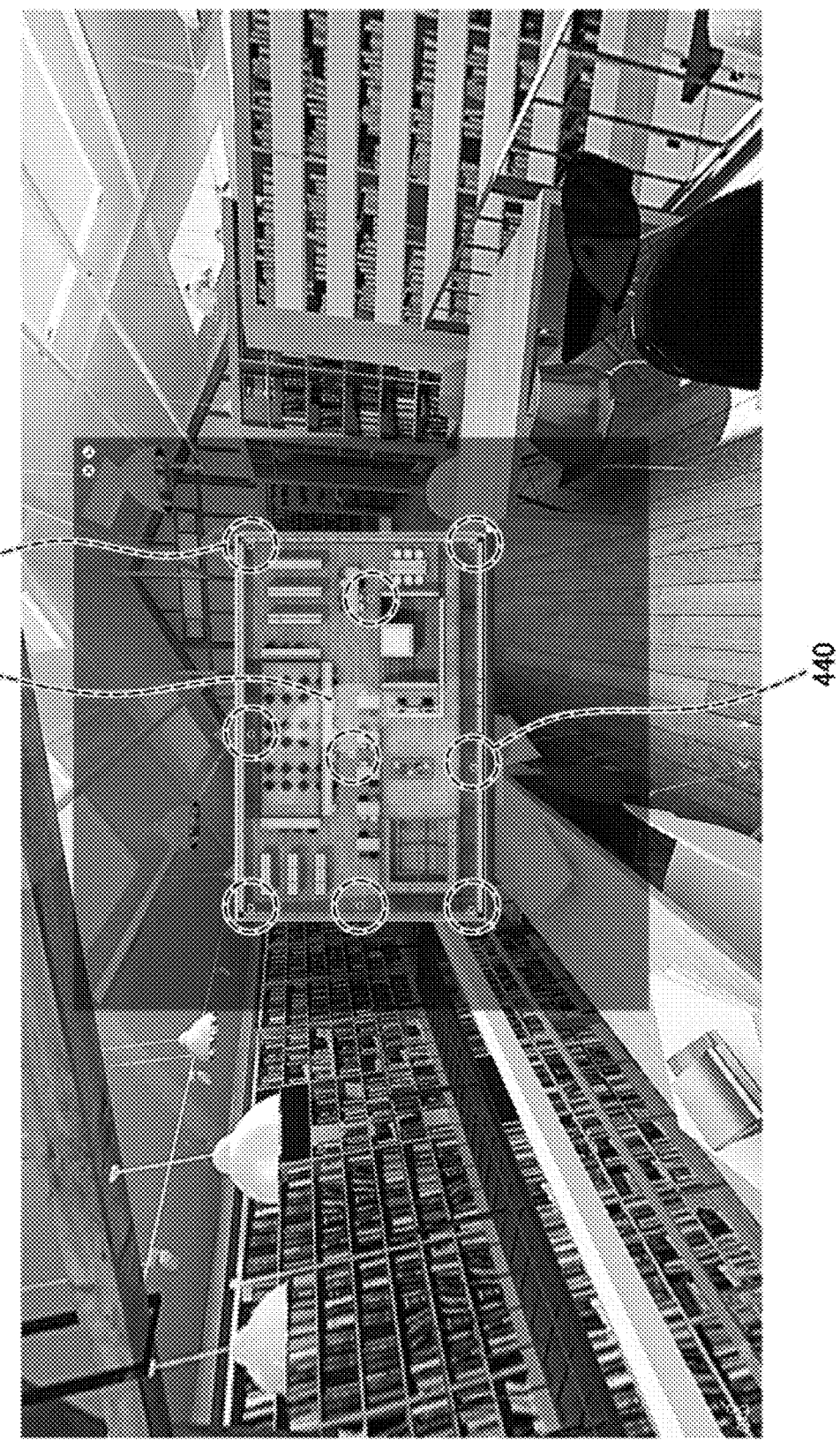

METHOD AND SERVER FOR PROVIDING VIRTUAL REALITY IMAGE ABOUT OBJECT

CROSS-REFERENCE TO RELATED APPLICATION

This application claims the benefit under 35 USC 119(a) of Korean Patent Application No. 10-2016-0118089 filed on Sep. 13, 2016, and Korean Patent Application No. 10-2016-0126277 filed on Sep. 30, 2016, in the Korean Intellectual Property Office, the entire disclosures of which are incorporated herein by reference for all purposes.

TECHNICAL FIELD

The present disclosure relates to a server and a method for providing a virtual reality image modeled using a taken image of an article for sale or rent and more particularly, to a server and a method for analyzing and providing user interest information about a virtual reality image of an article for sale or rent.

BACKGROUND

Generally, in order to sell or rent an article, such as real estate, for sale or rent, the owner or renter visits or telephones a real estate agency to request selling of the real estate. On the other hand, a buyer needs to visit each real estate agency in order to look for an article for sale or rent that meets his/her needs and in case of real estate for sale or rent, the buyer needs to visit and check an actual place.

Recently, with the advancement of the Internet and portable user devices, the transaction market has expanded from offline to online. Various transaction applications have been actively developed and supplied for online transaction services. Therefore, users of the applications can conveniently check information about an article for sale or rent and anytime and anyplace and then proceed with transaction.

However, in the conventional online transaction services, a consumer can only check information about articles for sale or rent unilaterally uploaded by a supplier. That is, it has been an inconvenience for consumers to be unable to take a close look at articles for sale or rent themselves as if visiting offline except information provided by a supplier or an agency.

For example, images of real estate for sale or rent provided by suppliers are taken from their point of view and thus may exclude anything against the suppliers. Further, since the images are 2-dimensional information, a consumer may feel there is a great difference between checking an article for sale or rent through an application and really seeing the article for sale or rent in terms of deepness or interior spaciousness.

Accordingly, there is a need for a technology for providing information about an article for sale or rent which enables a consumer to check detailed information about an article for sale or rent directly online and also helps the consumer in determining transaction with reference to other consumers' interest information about the article for sale or rent.

SUMMARY

In view of the foregoing, an exemplary embodiment of the present disclosure provides a 360-degree virtual reality image of a space of an article for sale or rent and thus provides a consumer with reality and spaciousness as if the consumer existed in a real space of the article for sale or rent to provide accurate information about the article for sale or rent to the consumer.

Further, an exemplary embodiment of the present disclosure analyzes and provides user interest information about a virtual reality image of an article for sale or rent on the basis of lookup results of multiple users.

According to an exemplary embodiment of the present disclosure, a method for providing a virtual reality image about an object performed by a server, the method includes: receiving a lookup request for a virtual reality image about an object selected by a user from a user device; and providing a virtual reality image including one or more 360-degree images corresponding to the object to the user device. Herein, the 360-degree image includes image data about views from multiple directions from a photographing location of the image and image data about a view from one direction are provided to the user device, and in response to an input to change a direction by the user device, image data corresponding to a view from another direction are provided. Further, the method for providing a virtual reality image about an object may include: after the step of providing of a virtual reality image, estimating locations of the user's gaze within the virtual reality image on the basis of an output area of a screen of the user device on which the virtual reality image is displayed; calculating a gaze density for each of multiple areas included in the virtual reality image on the basis of estimated locations of the user's gaze with respect to at least one user device; and providing interest information of at least one user about the object by displaying information about the calculated gaze density as being overlapped with the virtual reality image. Herein, the interest information is a virtual reality image displayed as being overlapped with a heatmap image generated on the basis of the gaze density.

According to another exemplary embodiment of the present disclosure, a server for providing a virtual reality image about an object, the server includes: a memory that stores therein a program for performing a method for providing a virtual reality image about an object; and a processor for executing the program, wherein upon execution of the program, when the processor receives a lookup request for a virtual reality image about an object by a user from a user device, the processor provides a virtual reality image including one or more 360-degree images corresponding to the object to the user device. Herein, the 360-degree image includes image data about views from multiple directions from a photographing location of the image, and image data about a view from one direction are provided to the user device, and in response to an input to change a direction by the user device, image data corresponding to a view from another direction are provided. Further, the memory may further store therein a program for analyzing and providing user interest information about the virtual reality image about the object, and in response to execution of the program, the processor may estimate locations of the user's gaze within the provided virtual reality image on the basis of an output area of a screen of the user device on which the virtual reality image provided to the user device is displayed, calculate a gaze density for each of multiple areas included in the virtual reality image on the basis of estimated locations of the user's gaze with respect to at least one user device, and provide interest information of at least one user about the object by displaying information about the calculated gaze density as being overlapped with the provided virtual reality image, and the interest information is a virtual reality image displayed as being overlapped with a heatmap image generated on the basis of the gaze density.

The present disclosure provides a 360-degree virtual reality image from which a space of an article for sale or rent can be checked from all directions and thus provides a consumer with reality about the article for sale or rent, e.g., real estate, as if the consumer were on the spot checking the interior of the article for sale or rent. Further, the 360-degree virtual reality image enables the consumer to take a close look at a partial space the consumer wants to check.

Furthermore, the present disclosure provides user interest information that enables the consumer to easily check which part of the article for sale or rent multiple users have looked up with interest.

Moreover, the present disclosure provides history data that enables the consumer to readily check changes of user interest information about the virtual reality image of the article for sale or rent over time.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

In the detailed description that follows, embodiments are described as illustrations only since various changes and modifications will become apparent to those skilled in the art from the following detailed description. The use of the same reference numbers in different figures indicates similar or identical items.

FIG. 3A through FIG. 3J illustrate examples of a screen on which virtual reality images are output in accordance with an exemplary embodiment of the present disclosure.

DETAILED DESCRIPTION

Figure 1:
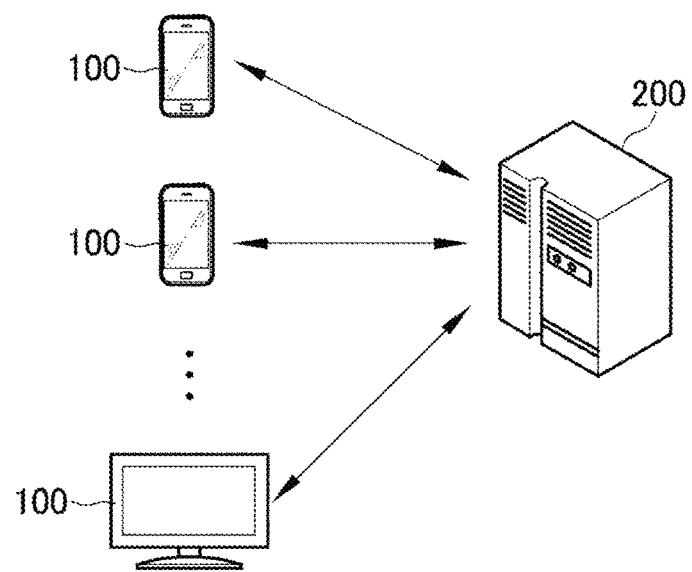
FIG. 1 is a configuration view of a system for providing a virtual reality image of an article for sale or rent in accordance with an exemplary embodiment of the present disclosure.

Hereinafter, embodiments of the present disclosure will be described in detail with reference to the accompanying drawings so that the present disclosure may be readily implemented by those skilled in the art. However, it is to be noted that the present disclosure is not limited to the embodiments but can be embodied in various other ways. In drawings, parts irrelevant to the description are omitted for the simplicity of explanation, and like reference numerals denote like parts through the whole document.

Through the whole document, the term "connected to" or "coupled to" that is used to designate a connection or coupling of one element to another element includes both a case that an element is "directly connected or coupled to" another element and a case that an element is "electronically connected or coupled to" another element via still another element. Further, the term "comprises or includes" and/or "comprising or including" used in the document means that one or more other components, steps, operation and/or existence or addition of elements are not excluded in addition to the described components, steps, operation and/or elements unless context dictates otherwise.

Through the whole document, the term "unit" includes a unit implemented by hardware, a unit implemented by software, and a unit implemented by both of them. One unit may be implemented by two or more pieces of hardware, and two or more units may be implemented by one piece of hardware. However, the "unit" is not limited to the software or the hardware, and the "unit" may be stored in an addressable storage medium or may be configured to implement one or more processors. Accordingly, the "unit" may include, for example, software, object-oriented software, classes, tasks, processes, functions, attributes, procedures, sub-routines, segments of program codes, drivers, firmware, micro codes, circuits, data, database, data structures, tables, arrays, variables and the like. The components and functions provided in the "units" can be combined with each other or can be divided up into additional components and "units". Further, the components and the "units" may be configured to implement one or more CPUs in a device or a secure multimedia card.

A "device" to be described below may be implemented with computers or portable devices which can access a server or another device through a network. Herein, the computers may include, for example, a notebook, a desktop, and a laptop equipped with a WEB browser. For example, the portable devices are wireless communication devices that ensure portability and mobility and may include all kinds of handheld-based wireless communication devices such as IMT (International Mobile Telecommunication)-2000, CDMA (Code Division Multiple Access)-2000, W-CDMA (W-Code Division Multiple Access) and LTE (Long Term Evolution) communication-based devices, a smart phone, a tablet PC, and the like. Further, the "network" may be implemented as wired networks such as a Local Area Network (LAN), a Wide Area Network (WAN) or a Value Added Network (VAN) or all kinds of wireless networks such as a mobile radio communication network or a satellite communication network.

In the following, the term "article for sale or rent" refers to an object, e.g., real estate and movable property, as a target of transaction, and may include, for example, an apartment, a building, a yacht, a car, and the like, and may also refer to various objects as targets to be taken by a camera.

Hereinafter, an exemplary embodiment of the present disclosure will be described in detail with reference to the accompanying drawings.

FIG. 1 is a configuration view of a system for providing a virtual reality image of an article for sale or rent in accordance with an exemplary embodiment of the present disclosure.

As illustrated in FIG. 1, the system for providing a virtual reality image of an article for sale or rent in accordance with an exemplary embodiment of the present disclosure includes a user device 100 and a server 200.

The user device 100 may refer to a device of a consumer who wants to buy or rent an article for sale or rent, but is not limited thereto. For reference, the consumer may refer to a user who has a need for using real estate such as buying or renting the real estate. The user device 100 accesses the server 200 and receives virtual reality images of multiple articles for sale or rent.

Hereinafter, in an exemplary embodiment of the present disclosure, for convenience in explanation, real estate will be exemplified as an article for sale or rent, and an image 3-dimensionally modeled using images of the inside space of the real estate will be described as a virtual reality image. However, in an exemplary embodiment of the present disclosure, the article for sale or rent is not limited to the real estate and the virtual reality image may be based on images of an outside space apart from the exterior of the real estate or the inside space and the outside space of another kind of article for sale or rent.

In accordance with an exemplary embodiment of the present disclosure, the server 200 is an apparatus that provides a virtual reality image of an article for sale or rent to multiple user devices 100 and analyzes and provides user interest information about the virtual reality image. Herein, the server 200 may further provide an online platform service which intermediates between a consumer and a supplier.

Figure 2:
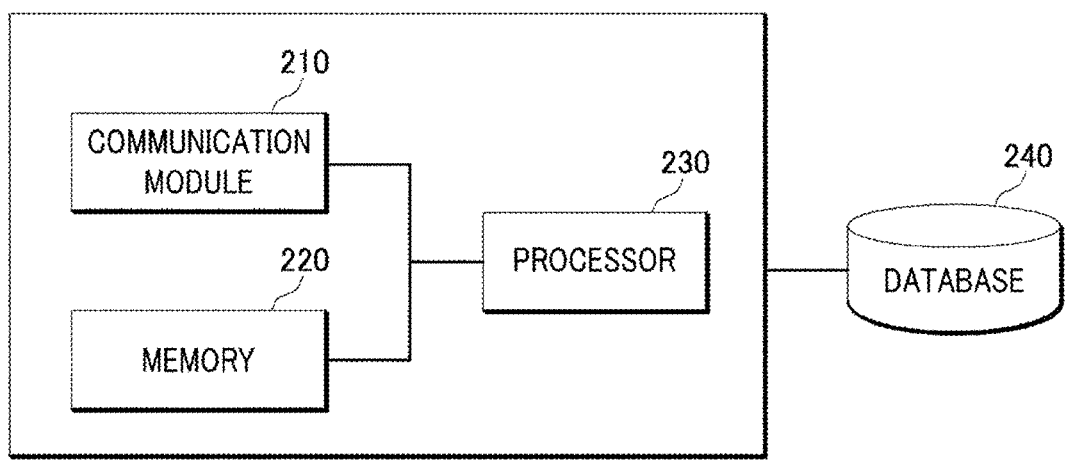
FIG. 2 is a block diagram of a configuration of an apparatus for providing a virtual reality image about an article for sale or rent in accordance with an exemplary embodiment of the present disclosure.

As illustrated in FIG. 2, the server 200 includes a communication module 210, a memory 220, a processor 230, and a database 240. Although FIG. 2 illustrates the memory 220 and the database 240 as separate components, the database 240 can also be implemented in a partial storage space of the memory 220.

The communication module 210 transmits and receives data to and from the user devices 100 according to respectively preset communication formats. Herein, the communication module 210 may transmit and receive various kinds of data under the control of the processor 230.

The memory 220 stores a program for providing a virtual reality image of an article for sale or rent (e.g., interior of real estate) and a program for providing heatmap information of the virtual reality image. Further, the memory 220 may further store a program for intermediating the article for sale or rent between a consumer and a supplier. The memory 220 generally refers to non-volatile storage devices that retains information stored therein even if power is not supplied thereto and volatile storage devices that needs power to retain information stored therein.

The processor 230 executes various programs stored in the memory to perform processes corresponding thereto.

Figure 3B:
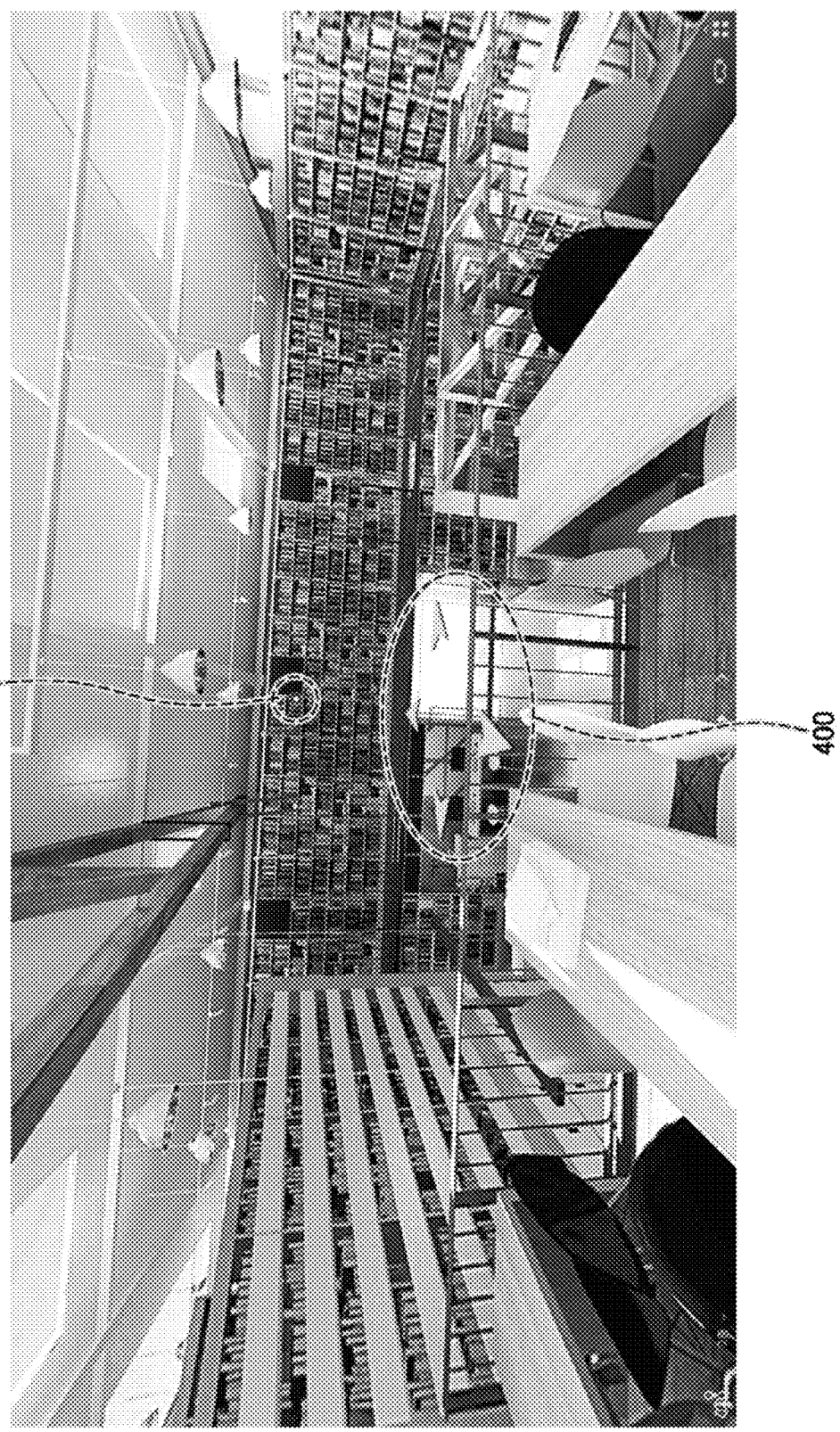
Figure 3C:
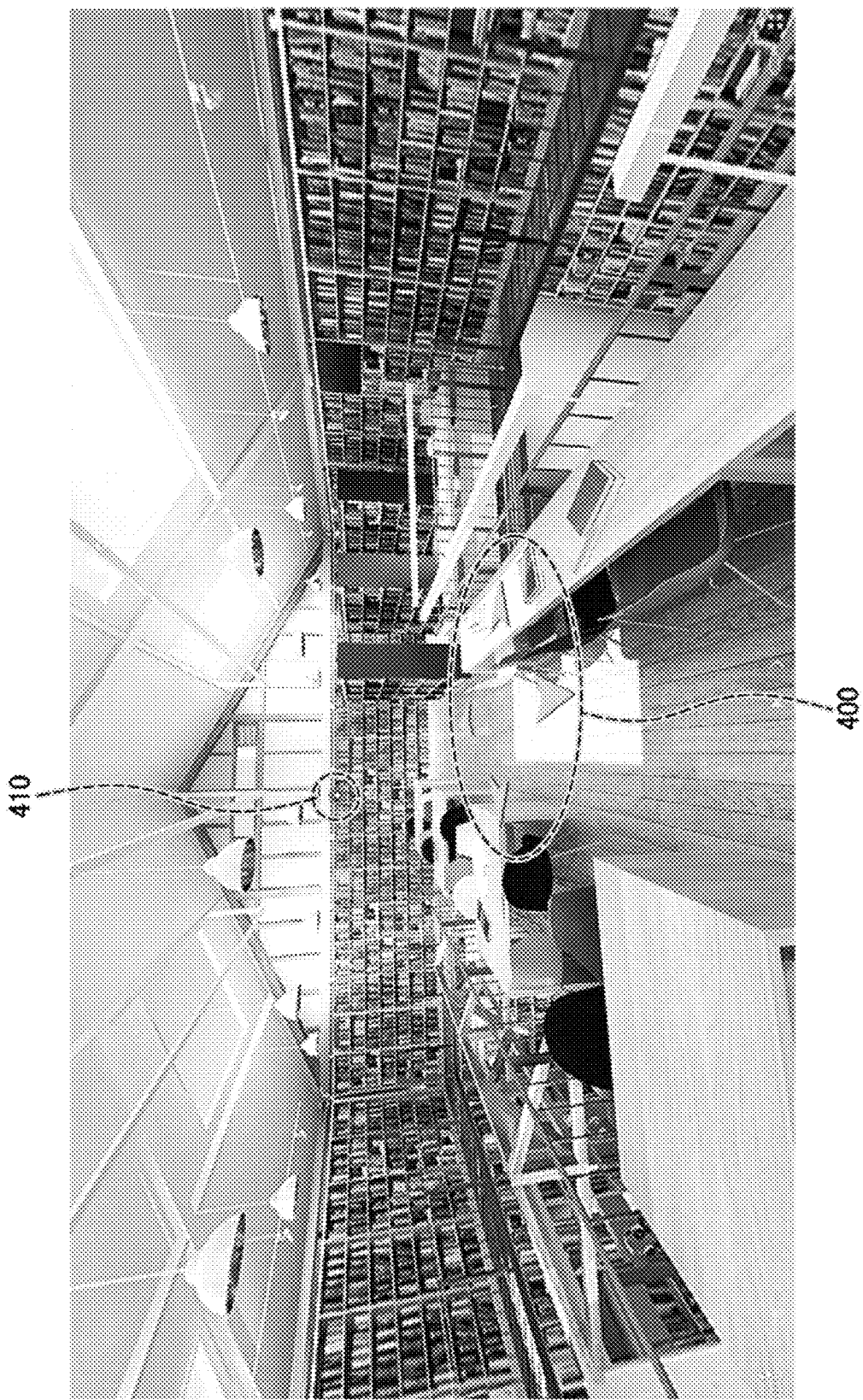
Figure 3D:
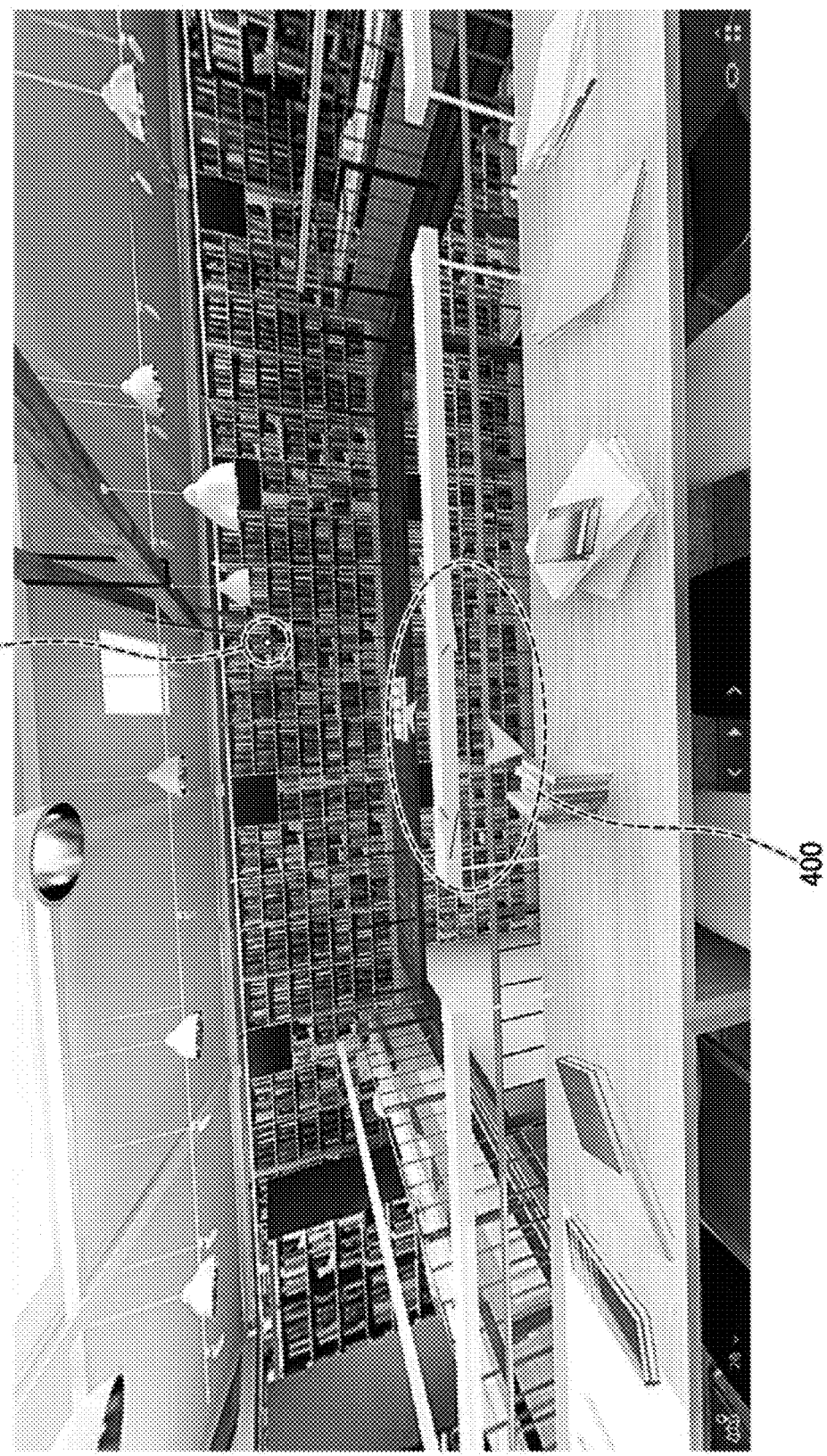
Figure 3E:
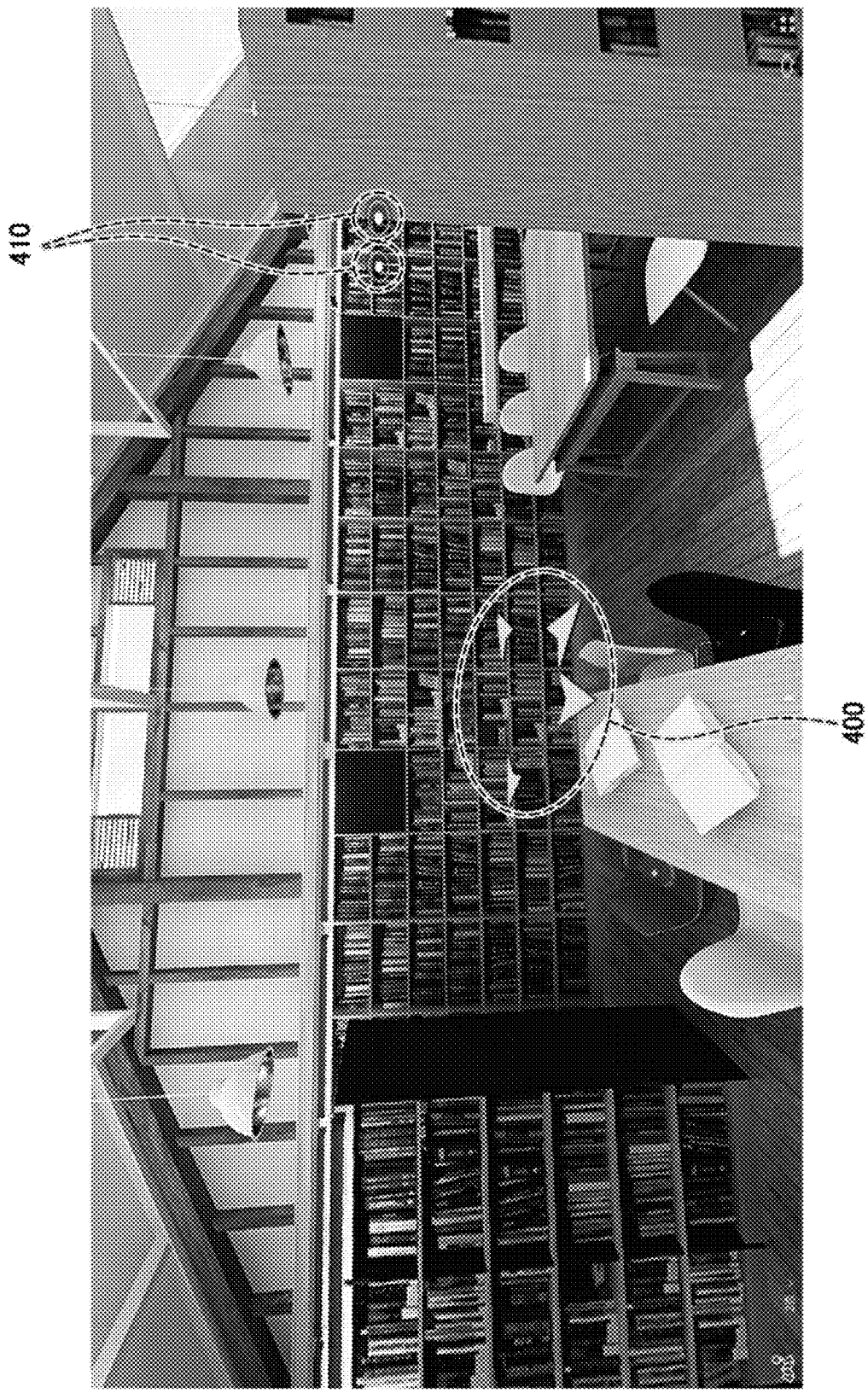

A process in which the processor 230 provides a virtual reality image of a certain real estate to the user device 100 upon execution of the programs stored in the memory 220 will be described in detail with reference to FIG. 3A and FIG. 3J.

The processor 230 provides a user interface (hereinafter, referred to as "consumer UI") that enables a user to look up real estate for sale or rent with the user device 100.

The processor 230 provides a list of multiple real estates for sale or rent through the consumer UI, and receives a lookup request for one of them. Then, the processor 230 provides a virtual reality image corresponding to a specific real estate through the consumer UI in response to the lookup request of the user. The virtual reality image is previously stored in the database 240 and may be received from a device (not illustrated) of a supplier of the real estate. For reference, the supplier may include a user who wants to actually sell or rents an article for sale or rent and an agency who intermediates transaction between consumers.

The virtual reality image is an image of a real article for sale or rent as illustrated in FIG. 3A through FIG. 3J, and provides the user with reality as if the user were on the spot of the real estate. The user can acquire more realistic and in-depth information from the virtual reality image than from a typical 2-dimensional image. Further, the user can use the virtual reality image as if the user were actually moving and checking the inside of a 3-dimensional room, and thus can acquire more accurate information about the real estate for sale or rent.

The virtual reality image includes one or more 360-degree images. The 360-degree images are images including image data about views from all directions from a location of a camera taking images. For example, the images illustrated in FIG. 3A through FIG. 3D are images of the front side/right side/back side/left side around a location of a camera. Data of all of these front image, right image, back image and left image are included in the 360-degree images taken from the location of the camera. Meanwhile, one 360-degree image may include image data of various other sides such as an upper side or a lower side and may correspond to one panoramic image.

If such a 360-degree image is provided on the user device 100, image data of a view in any one of various directions are provided. For example, front image data as shown in FIG. 3A may be provided. If the user device 100 provides an input to change the direction, image data of a view in another direction may be provided. For example, if the user device 100 provides an input to change the direction to right from the state displayed on the user device 100 in FIG. 3A, image data as shown in FIG. 3B may be displayed on the user device 100.

In this case, the input by the user device 100 may be any one of pointer input using a direction control means such as a mouse, user touch input, user's gesture and displacement caused by movement of the user device 100.

Specifically, if the user device 100 is a desktop, a pointer input of moving a pointer (e.g., cursor) on a screen to a certain direction using a control means such as a mouse or keyboard direction keys may be used as the user input. If the user device 100 is a touch-sensing portable device, an input of flicking or dragging a finger to any one direction, an input of the user's gesture, or a displacement value caused by a change in location of the user device 100 may be used as the user input.

For example, if the user device 100 is a smart device such as a smart phone or a tablet PC and interworks with a head mounted display apparatus (e.g., a card board, and the like), the user may see a 360-degree image through the head mounted display apparatus. In this case, when a positon of the user device 100 or the head mounted display apparatus is changed, image data of the 360-degree image can also be changed. In this case, if the user turns his/her head to the right, a right image is looked up, and if the user turns his/her head to the left, a left image is looked up. Thus, the user can be provided with vividness and reality as if he/she were on the spot seeing the object.

The 360-degree image can be processed on the basis of a panoramic image. The panoramic image is a 2-dimensional image obtained by synthesizing multiple image frames taken from 360-degree angles. Herein, the multiple image frames may be taken by a 360-degree camera, or may be taken by a combination of a smart device and another device with a camera photographing function. For example, in the latter case, multiple image frames may be taken by a combination of an automatic rotator, a smart device, a wide-angle fisheye lens, and a tripod. Specifically, the smart device may be mounted on the automatic rotator placed on the tripod and the wide-angle fisheye lens is installed on a camera of the smart device, and then the smart device may be set to take an image at a predetermined interval while the automatic rotator rotates 360 degrees at a constant speed. In this case, the smart device may acquire image frames of all directions around a specific reference point (i.e., a photographing location where the smart device is placed) in the inside space. Further, an image taken by the wide-angle fisheye lens may have a wider field of view than an image taken by a normal lens, and, thus, even when the smart device faces forward, image showing up to the ceiling and the floor surface can be acquired.

The processor 230 of the server 200 may provide a supplier UI, which enables a panoramic image generated by taking 360-degree images of the inside space of real estate to be uploaded to the server 200, to a supplier device (not illustrated) through the communication module 210. The supplier device (not illustrated) can transmit the panoramic image to the server 200 through the supplier UI.

Meanwhile, as shown in the article for sale or rent (i.e., library) in FIG. 3A through FIG. 3J, the whole space of the article for sale or rent may not be imaged just by taking images from one location with a camera. In this case, the virtual reality image is configured to include images taken from multiple locations. That is, the virtual reality image may include two or more 360-degree images taken from different locations, and each of the 360-degree images included in the virtual reality image may be taken from locations separated from each other. Otherwise, if the real estate includes several rooms and each room can be covered in a 360-degree image, 360-degree images may be respectively taken from different rooms.

Each 360-degree image may include information about a location, information about an identifier 410, and a movement identification mark 400.

Specifically, each 360-degree image may include location information of a location where the image is taken by a camera. Such location information may be stored as absolute information such as GPS data or relative location values between the 360-degree images.

Further, the identifier 410 included in each 360-degree image refers to information displayed to indicate a location of the present 360-degree image in another 360-degree image. The identifier 410 is information provided to show a location of another 360-degree image relative to the location of the image (i.e., the present 360-degree image) currently looked up by the user.

For example, the identifier 410 may be displayed as a dot as shown in FIG. 3A through FIG. 3E. For example, if the user device 100 provides a click input to the identifier 410 in FIG. 3A, the 360-degree image of FIG. 3A is removed from the screen of the user device 100 and the 360-degree image of FIG. 3E corresponding to the clicked identifier 410 may be provided on the user device 100.

Further, the movement identification mark 400 refers to information provided to show a movable direction from a location (i.e., output location) currently looked up by the user on the user device 100. The movement identification mark 400 is generated on the basis of location information between a 360-degree image currently provided on the user device 100 and another 360-degree image.

For example, as for the 360-degree image of FIG. 3A, there are different 360-degree images of the right side, left side, front side, and back side, respectively. Therefore, the movement identification mark 400 as shown in FIG. 3A may be generated. FIG. 3A illustrates the movement identification mark 400 as arrows, but the present disclosure is not limited thereto, and the movement identification mark 400 may be implemented with various shapes such as circle, square, triangle, and the like to show a movement direction.

Figure 3F:
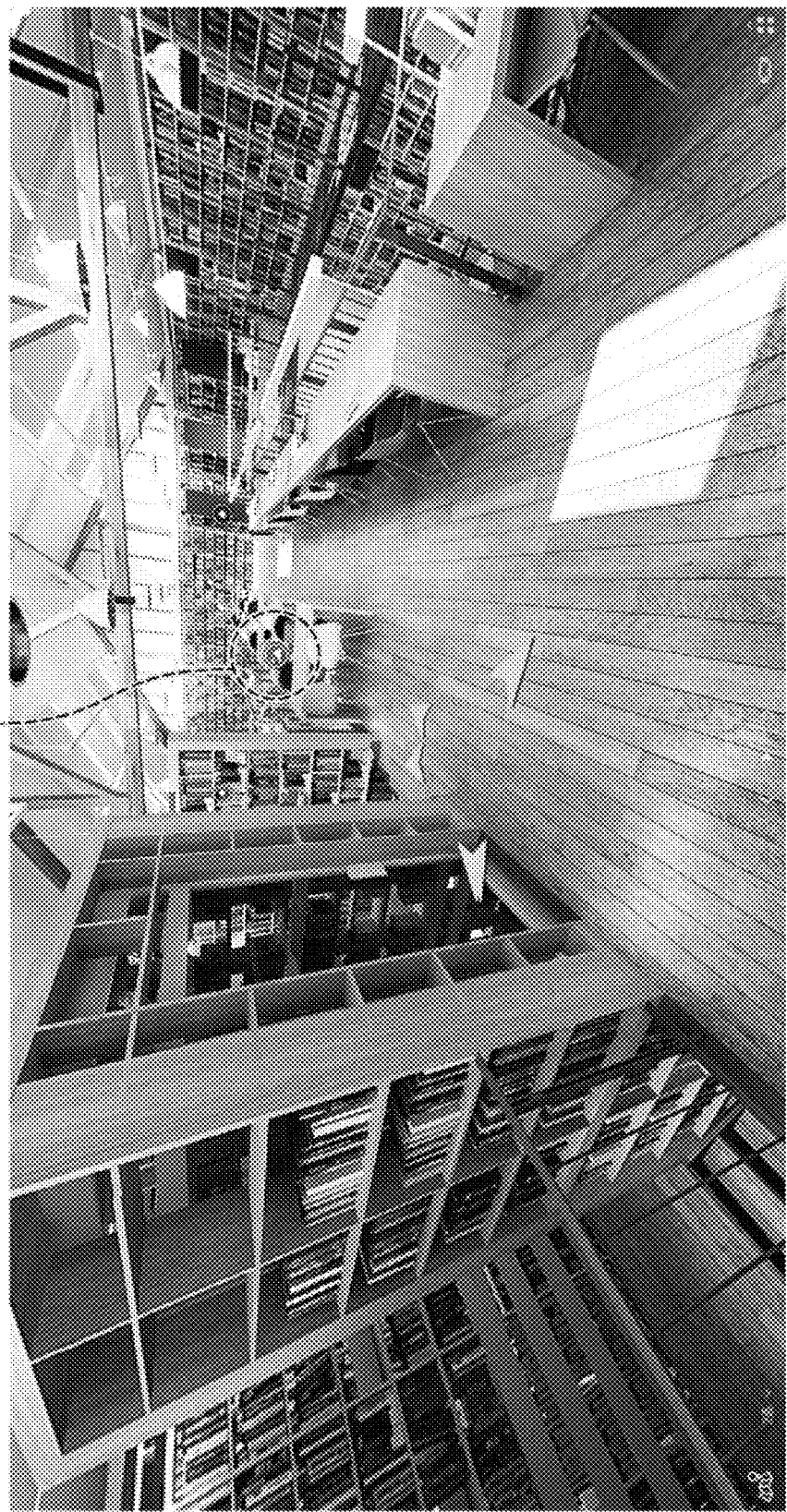

Referring to FIG. 3F, each 360-degree image may include another mark 420. The mark 420 may include information such as text, image, video, URL, and the like to explain specific information.

Figure 3G:

For example, if the mark 420 in FIG. 3F is clicked on the user device 100, a photo 430 may be provided as a separate pop-up window as shown in FIG. 3G. The photo 430 is an image of the library taken from a location of the mark. However, the use of the mark 420 is not limited thereto, but may include information such as text or video to provide various information as described above.

Further, the processor 230 of the server 200 may further provide a plan map 440 of the interior of the real estate in response to an input by the user device 100. Referring to FIG. 3H, the plan map 440 of the corresponding floor of the library illustrated in FIG. 3A through FIG. 3F can be seen.

The plan map 440 includes location information 450 of all 360-degree images of the real estate and guide information indicating a direction in which the user looks at through a 360-degree image. Herein, the guide information 460 may be displayed as a fan shape. A direction of a straight line bisecting the fan shape indicates a direction of the image shown in FIG. 3H. Herein, the center point of the fan shape is displayed corresponding to a location of the 360-degree image provided on the user device 100. Thus, the plan map 440 may also provide the location information 450 of a 360-degree image currently provided on the user device 100.

Herein, if another 360-degree image is clicked on the user device 100, the 360-degree image may be provided on the user device 100.

Figure 3I:
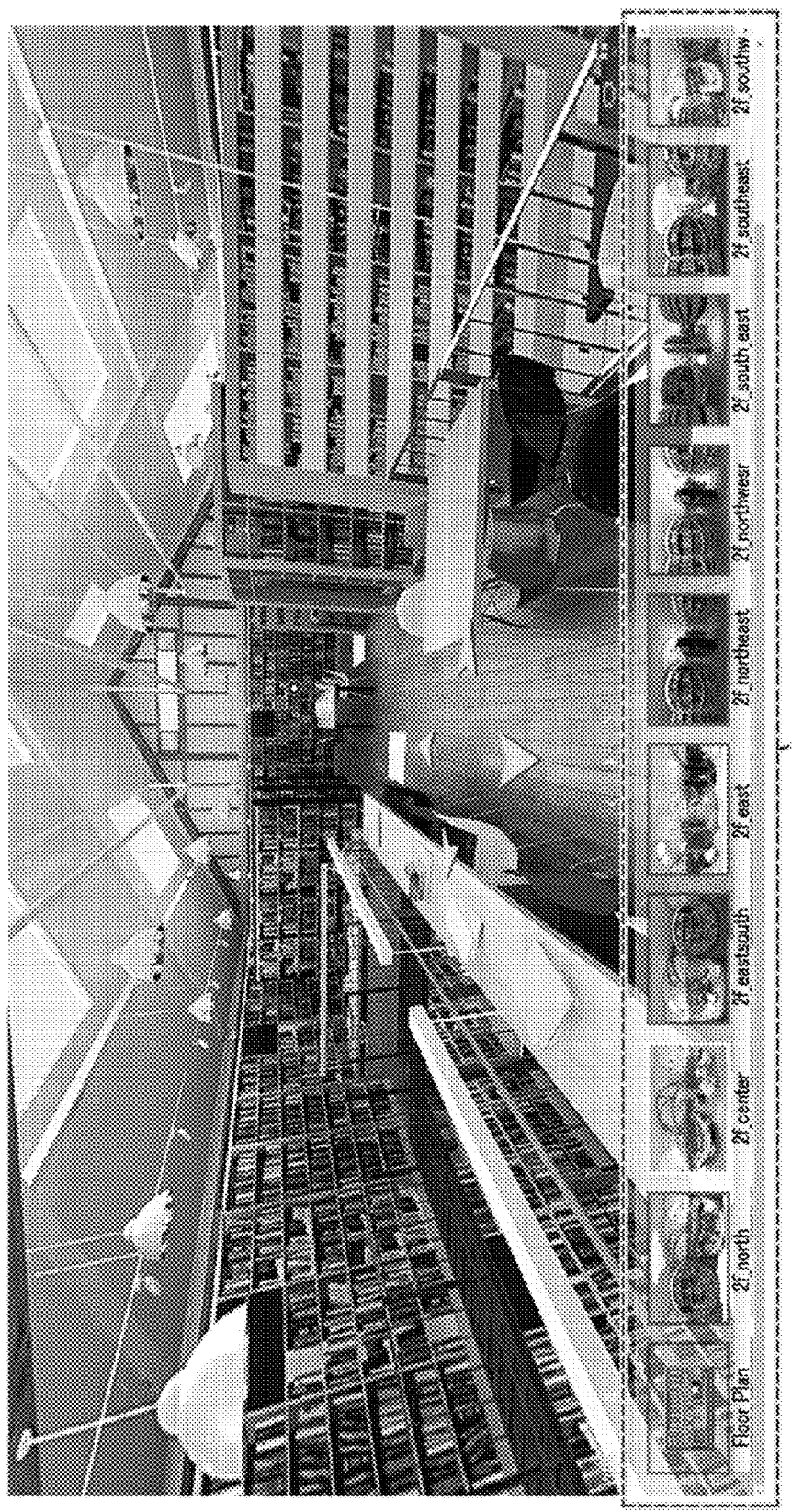
Figure 3J:
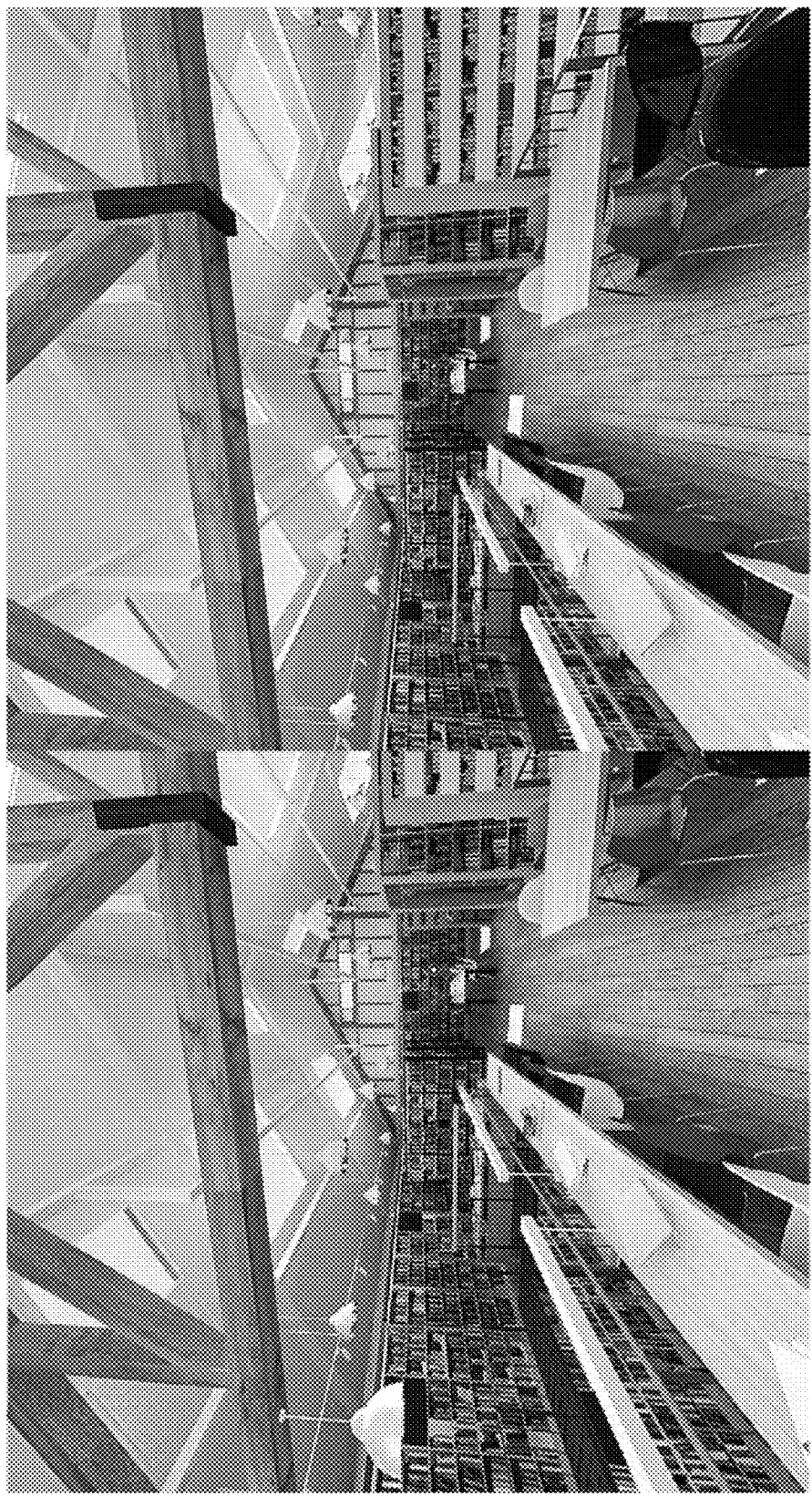

Further, as shown in FIG. 3I, the processor 230 may display and align a menu 470 including representative images of all 360-degree images included in the virtual reality image to the bottom of the screen in response to an input by the user device 100. In this case, if any one representative image is clicked on the user device 100, the clicked 360-degree image may be displayed on the user device 100.

Meanwhile, the processor 230 may provide a VR button (not illustrated) through the consumer UI. In this case, if the VR button is clicked on the user device 100, the processor 230 divides a display area of the user device 100 into two right and left areas and identically displays a 360-degree image being provided on the two divided areas as shown in FIG. 3J. This can be used as a function of providing a VR image in the case where a VR device is provided in the user device 100 (i.e., smart device). This can be used as a function of providing a VR image through a head mounted display device in the case where the head mounted display device interworks with the user device 100 (i.e., smart device). Herein, if an application executed in the user device has a function of recognizing the focus of the user's eye, the focus of the user's eye turns to an identifier, the screen may be switched to a 360-degree image corresponding to the identifier.

Then, a process in which the processor 230 analyzes and provides user interest information about a virtual reality image of an article for sale or rent upon execution of the programs stored in the memory 220 will be described in detail with reference to FIG. 4.

Figure 4:
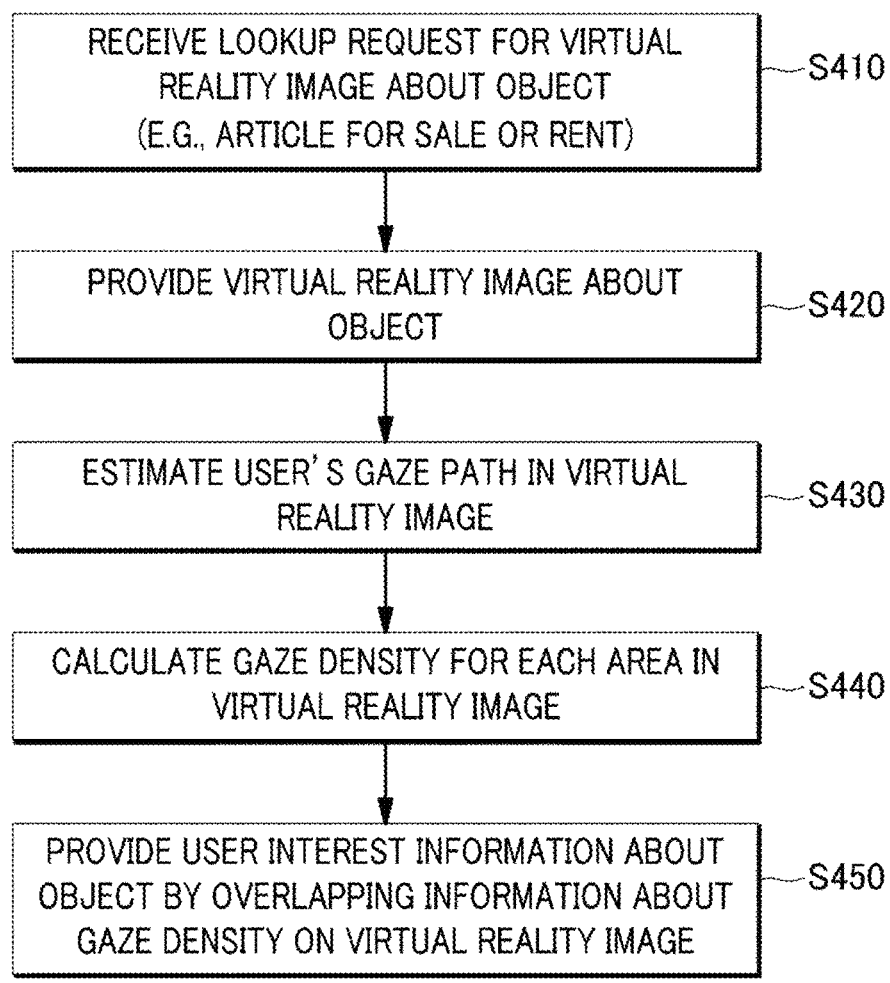
FIG. 4 is a flowchart provided to explain a method for analyzing user interest information about an image of an article for sale or rent in accordance with an exemplary embodiment of the present disclosure.

As shown in FIG. 4, the processor 230 receives a lookup request for an image (i.e., virtual reality image) of an article for sale or rent selected by a user from the user device 100 (S410).

In this case, the processor 230 may provide a list of multiple articles for sale or rent on the consumer UI of the user device 100 through the communication module 210, and receive a lookup request for a virtual reality image of an article for sale or rent selected by the user through the consumer UI.

Then, the processor 230 provides the requested virtual reality image corresponding to the article for sale or rent to the user device 100 (S420).

Specifically, the processor 230 may detect the virtual reality image corresponding to the article for sale or rent selected by the user from the database 240 and provide the virtual reality image through the consumer UI. In this case, the provided virtual reality image may include at least one 360-degree image including image data about views from all directions from a photographing location in a space of the article for sale or rent. For example, the processor 230 provides image data about a view from one direction on an output area of the user device 100 and provides image data about a view from another direction on the output area in response to a direction control input by the user device 100.

Herein, the direction control input may be at least one of a trajectory value of a pointing means displayed on the user device 100, a trajectory value of a virtual pointer controlled by a user touch input by the user device including a touch screen, or a displacement value of the user device 100.

Herein, regarding the displacement value of the user device 100, if a card board is combined with the user device 100 and the user wears the combined device over his/her eyes and an image is provided on the user device 100 as being bisected, the user may feel virtual reality as if he/she were located in the space. In this case, if the user turns his/her face, displacement of the user device 100 is changed. Such a change may be detected and image data about a view from a side direction may be provided. That is, a displacement value of the user device 100 may be regarded as a pointer trajectory value in order to determine which direction the user turns his/her head to check an image.

As such, the process in which the processor 230 provides a virtual reality image of an article for sale or rent to the user device 100 has been described above with reference to FIG. 3A through FIG. 3J.

Then, the user's gaze path in the virtual reality image provided to the user device 100 is estimated on the basis of an area (i.e., output area) of the screen of the user device 100 on which the virtual reality image is displayed (S430).

Specifically, the processor 230 may receive a pointer trajectory value about the virtual reality image from the user device 100, detect an output area on the basis of the received pointer trajectory value, determine a central area of the detected output area as a location of the user's gaze, and then estimate a combination of the determined locations of the user's gaze as the user's gaze path.

In this case, if the processor 230 receives an input to select a specific point in the output area through the pointer and then move the pointer from the user device 100, the process in which the processor 230 receives the pointe trajectory value from the user device 100 may include a process in which a virtual reality image displayed on the output area is changed in response to the movement of the pointer and information about the movement of the pointer is detected as a trajectory value of the pointer. For reference, if the user device 100 is a user control means such as a mouse or keyboard direction keys, the processor 230 may receive a pointer trajectory value as described above.

For reference, if all of pointer trajectory values received in real time from the user device 100 are used in estimating the user's gaze path, the load may be greatly increased in terms of processing time and resource efficiency. Therefore, the processor 230 may record pointer trajectory values received from the user device 100 at a predetermined interval, received predetermined number of times or less for a predetermined period of time, or received when the pointer is moved again after a stop for a predetermined period of time or more, and use the recorded pointer trajectory values in estimating the user's gaze path. For example, a pointer trajectory value may be used by recording a location of a mouse pointer 5 times per second.

Meanwhile, the processor 230 may receive a displacement value caused by a movement of the user device 100 or a movement of the user wearing a VR device. In this case, the processor 230 may detect an output area on the basis of the displacement value generated by the user device 100 or the VR device and determine a central area of the output area as a location of the user's gaze.

Then, a gaze density for each of multiple areas included in the virtual reality image is calculated on the basis of the estimated user's gaze path (S440).

Herein, the processor 230 may use the estimated user's gaze path for each of the multiple user devices 100 in analyzing user interest information to be described later. That is, users' gaze paths about the same article for sale or rent on the multiple user devices 100 may be collected to calculate a gaze density in the virtual reality image of the article for sale or rent.

Specifically, assuming that a virtual reality image output area (i.e., area displayed on the screen of the user device 100) includes multiple subdivision areas, the processor 230 may calculate a gaze density by calculating a frequency value for a subdivision area corresponding to a location of the user's gaze from among the multiple subdivision areas and determine that as the calculated frequency value is increased, a gaze density of the corresponding subdivision area is increased.

Further, the processor 230 may calculate a gaze density for each area in the virtual reality image by applying, as a weighting, at least one of the number of users' gazes fixed for a predetermined period of time, a period of time for a user's gaze to be fixed, and the number of times of being passed through by a user's gaze on move. For example, the processor 230 may detect areas in order from highest frequency to lowest frequency, which are determined as locations of the user's gaze, from among multiple areas in a virtual reality image of a certain article for sale or rent. Further, the processor 230 may determine that as the detected frequency is increased, a gaze density is increased, and may apply a weighting to the gaze density as a period of time for the user's gaze to stay is increased. Furthermore, an output area or a subdivision area present on the user's gaze path may be determined as being passed through by the user's gaze even if it is not determined as a location of the user's gaze and the number of times thereof may also be applied as a weighting to the gaze density.

Then, information about the calculated gaze density is displayed as being overlapped on the virtual reality image to provide interest information of the multiple users about the corresponding article for sale or rent (S450).

That is, the processor 230 generates interest information which makes it possible to distinguish areas with high interest of the multiple users in virtual reality images of multiple articles for sale or rent, respectively. As the interest information, a virtual reality image overlapped with statistical information about the user's gaze density is provided, and, thus, the users can conveniently check information about an area with interest of other users in a corresponding article for sale or rent.

Herein, the virtual reality image displayed as being overlapped with the user interest information may not be a 360-degree image, but be a panoramic image corresponding to a 360-degree image. Otherwise, in an additional exemplary embodiment, if interest is high only in a specific image frame from among multiple 2-dimensional image frames constituting a panoramic image, user interest information may be displayed as being overlapped with the specific image frame only.

Specifically, the processor 230 may provide a virtual reality image displayed as being overlapped with a heatmap image generated on the basis of a gaze density as the interest information. In this case, the processor 230 generates a heatmap image displayed by applying a predetermined color to a subdivision area with a gaze density equal to or higher than a threshold value from among multiple subdivision areas included in an output area on the basis of the calculated gaze density, as information about the gaze density. Generally, a heatmap is a graphical representation of data where the individual values contained in a matrix are represented as colors. In an exemplary embodiment of the present disclosure, a heatmap image is represented as a predetermined color depending on a value (i.e., gaze density) matched with each subdivision area in a virtual reality image. That is, the heatmap image is applied with colors differently set for multiple gaze density ranges, respectively.

Figure 5:
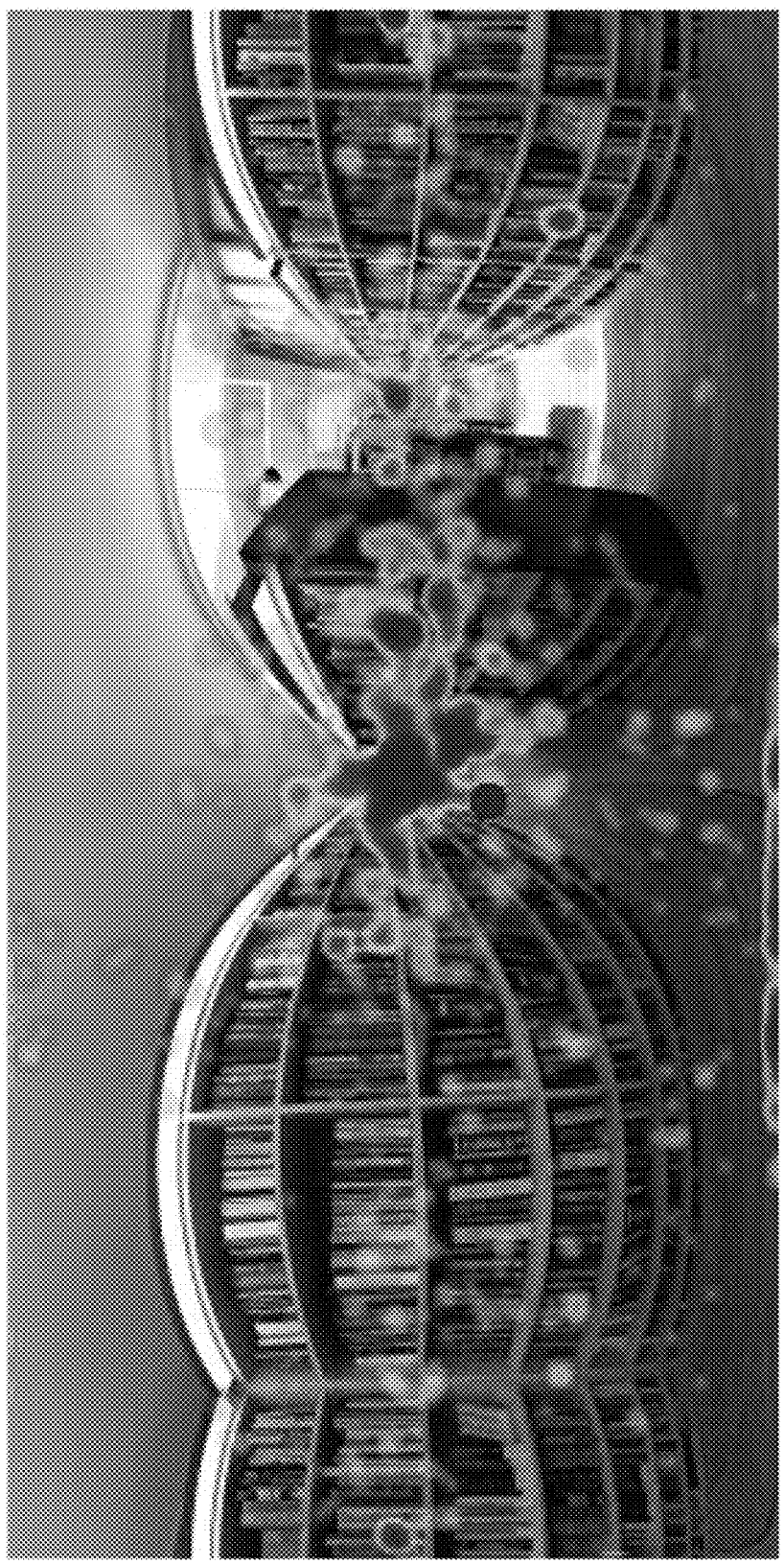
FIG. 5 illustrates an example of a virtual reality image displaying a heatmap image in accordance with an exemplary embodiment of the present disclosure.

For example, the processor 230 may display, on a certain output area in a virtual reality image, a high-density area with the highest gaze density equal to or higher than the threshold value as red, a low-density area with a density lower than that of the high-density area as green, and an area with a gaze density equal to or lower than the threshold value without a color, as shown in FIG. 5. As such, colors for implementing a heatmap image and density ranges as standards to apply the respective colors are not limited.

Further, the processor 230 collects the calculated gaze densities from the multiple user devices 100 in response to a lookup request for a virtual reality image about the same article for sale or rent in order to provide interest information of the multiple users about an article for sale or rent, respectively matches the collected gaze densities with the same-density areas in the virtual reality image, and generates a heatmap image of the virtual reality image by applying the matched gaze densities. In this case, the processor 230 may generate a heatmap image on the basis of the calculated gaze densities for the multiple user devices accumulated at a predetermined interval for a predetermined period of time. For example, the processor 230 may generate a heatmap image by applying the calculated gaze densities to all users accessing the server 200 daily, weekly, or monthly for a predetermined period of time.

Meanwhile, the processor 230 may generate and generate heatmap history data in which the heatmap images generated at the interval are consecutive with respect to a time axis.

Figure 6:
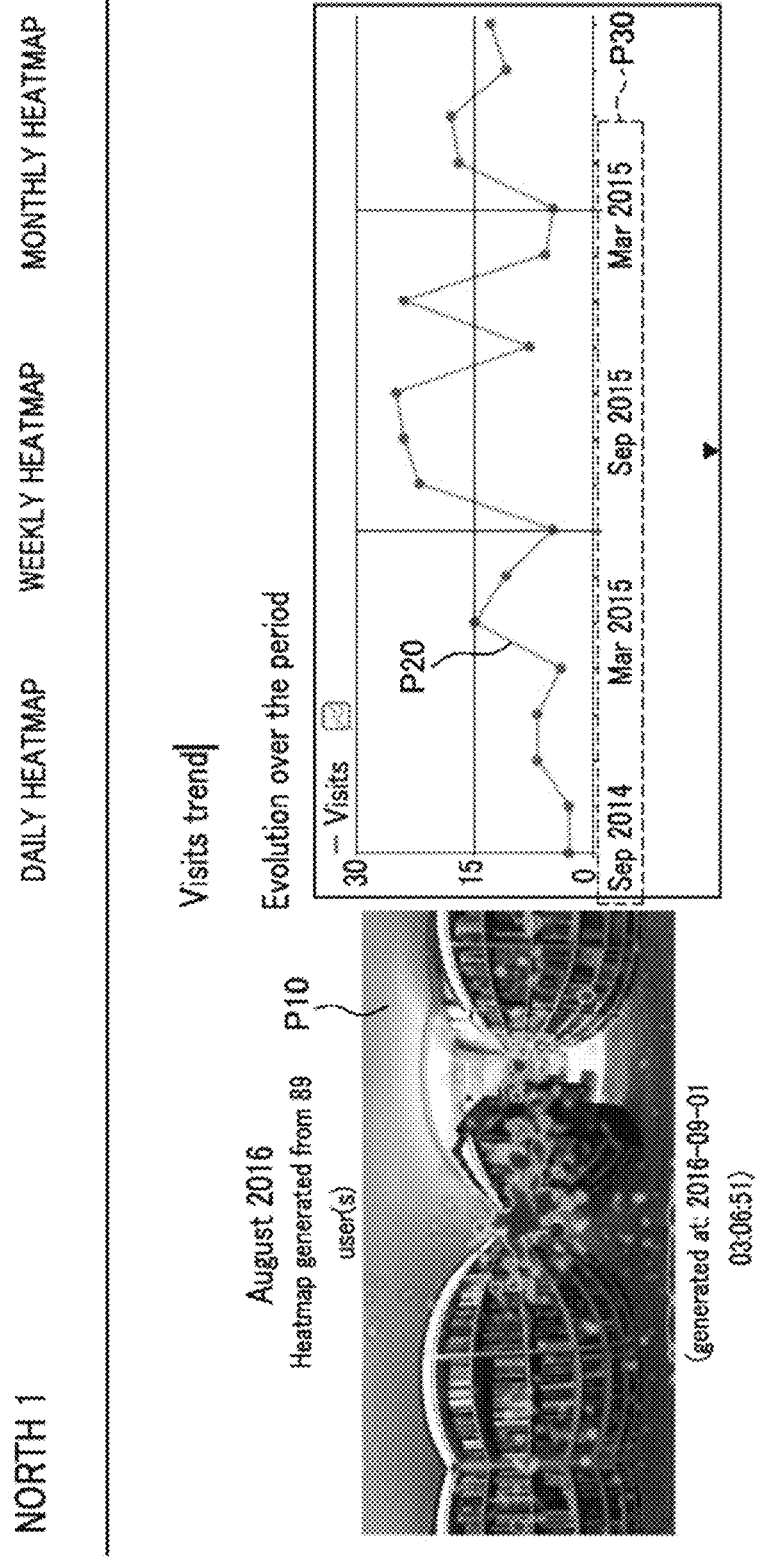
FIG. 6 illustrates an example of a screen on which heatmap history data are output in accordance with an exemplary embodiment of the present disclosure.

For example, as shown in FIG. 6, a user interface including an output window P10 on which the heatmap images generated at the interval and included in the heatmap history data are displayed and a time selection menu P20 for selecting a temporal location of a heatmap image to be displayed on the output window P10 may be provided. For example, the time selection menu P20 may display a change in user interest as a graph of line as shown in FIG. 6, and if the user selects a certain area from the graph of line, a heatmap image corresponding to its temporal location may be displayed on the output window P10. Further, the time selection menu P20 may be located at the bottom of a time menu P30 and implemented with a bar shape that allows selection of a certain position along the flow of time, but a shape thereof is not limited.

The heatmap history data may be matched for each article for sale or rent and then stored in the database 240. If a lookup request for heatmap history data about a certain article for sale or rent is received from the user device 100 and devices (not illustrated) of the supplier, the processor 230 may provide each device with a user interface capable of displaying the history data. In this case, the history data may be displayed for each panoramic image corresponding to a 360-degree image.

Further, as shown in FIG. 6, the processor 230 may provide each device with a user interface on which statistical information of heatmap, such as daily heatmap, weekly heatmap, and monthly heatmap, can be checked at a predetermined time interval.

The embodiment of the present disclosure can be embodied in a storage medium including instruction codes executable by a computer such as a program module executed by the computer. Besides, the data structure in accordance with the embodiment of the present disclosure can be stored in the storage medium executable by the computer. A computer-readable medium can be any usable medium which can be accessed by the computer and includes all volatile/non-volatile and removable/non-removable media. Further, the computer-readable medium may include all computer storage and communication media. The computer storage medium includes all volatile/non-volatile and removable/non-removable media embodied by a certain method or technology for storing information such as computer-readable instruction code, a data structure, a program module or other data. The communication medium typically includes the computer-readable instruction code, the data structure, the program module, or other data of a modulated data signal such as a carrier wave, or other transmission mechanism, and includes a certain information transmission medium.

The system and method of the present disclosure has been explained in relation to a specific embodiment, but its components or a part or all of its operations can be embodied by using a computer system having general-purpose hardware architecture.

The above description of the present disclosure is provided for the purpose of illustration, and it would be understood by those skilled in the art that various changes and modifications may be made without changing technical conception and essential features of the present disclosure. Thus, it is clear that the above-described embodiments are illustrative in all aspects and do not limit the present disclosure. For example, each component described to be of a single type can be implemented in a distributed manner. Likewise, components described to be distributed can be implemented in a combined manner.

The scope of the present disclosure is defined by the following claims rather than by the detailed description of the embodiment. It shall be understood that all modifications and embodiments conceived from the meaning and scope of the claims and their equivalents are included in the scope of the present disclosure.

I claim:

1. A processor-implemented method for providing a virtual reality image about an object performed, the processor-implemented executable by a server, the method comprising:

receiving, by a processor of the server, a lookup request for the virtual reality image about the object selected by a user device in communication with the server;

providing, by the processor, the virtual reality image for display by the user device, the virtual reality image including one or more 360-degree images corresponding to the object to the user device, wherein the one or more 360-degree image comprise image data about views from multiple directions from a photographing location of the image, and wherein the image data about views from multiple directions comprises image data about a view from one direction and also provided with image data about a view from another direction in response to an input to change a direction by the user device;

determining, by the processor, a plurality of gaze densities for a plurality of areas included in the virtual reality image based on a user gaze path with respect the user device, each of the plurality of gaze densities comprising a frequency value corresponding to locations of the user gaze path from among the plurality of areas, each of the plurality of gaze densities increasing as the corresponding frequency value increases;

providing, by the processor, interest information for display by the user device with the virtual reality image, the interest information overlapping the virtual reality image based on the plurality of gaze densities; and estimating the locations of the user gaze path within the virtual reality image on the basis of an output area of a screen of the user device on which the virtual reality image is displayed, wherein the interest information comprises a virtual reality image displayed as being overlapped with a heatmap image generated on the basis of the plurality of gaze densities, wherein the estimating of the locations of the user gaze path comprises: receiving a pointer trajectory value about the virtual reality image from the user device; detecting the output area on the basis of the pointer trajectory value; determining a central area of the detected output area as the locations of the user gaze path; and estimating a combination of the determined locations of the user gaze path, wherein the receiving of the pointer trajectory value comprises: in case of receiving an input to select a specific point in the output area through a pointer and then move the pointer from the user device, changing a virtual reality image displayed on the output area in response to the movement of the pointer; and detecting information about the movement of the pointer as a trajectory value of the pointer, and wherein the trajectory value of the pointer is received at a predetermined interval, received a predetermined number of times or less for a predetermined period of time, or received when the pointer is moved again after a stop for a predetermined period of time or more.

2. The processor-implemented method of claim 1, wherein the input to change the direction by the user device is at least one of a touch input, an input of a pointer trajectory value, an input of the user's gesture, and an input of a displacement value caused by a change in location of the user device.

3. The processor-implemented method of claim 1, wherein the virtual reality image includes two or more 360-degree images, and each of the two or more 360-degree images are taken from separated locations or different spaces.

4. The processor-implemented method of claim 3, wherein the 360-degree image includes identifier information and location information,
the identifier information is information about an identifier indicating a location of each 360-degree image in another 360-degree image, and
the location information is information about a location where each 360-degree image is taken by a camera.

5. The processor-implemented method of claim 4, wherein if an input about an identifier for a second 360-degree image in a first 360-degree image provided on the user device is received by the server from the user device,
the first 360-degree image is removed and the second 360-degree image is displayed on the user device.

6. The processor-implemented method of claim 4, wherein an identifier for a second 360-degree image displayed in a first 360-degree image provided on the user device includes a movement identification mark to guide a lookup of the second 360-degree image on the basis of location information of the first and second 360-degree images.

7. The processor-implemented method of claim 1, further comprising:
providing a map about a space of the object in response to an input received by the server from the user device after the providing of a virtual reality image,
wherein the map comprises location information of the one or more 360-degree images of a space of the object, location information being provided to the user device, and
wherein the map comprises guide information that indicates a direction in which the user looks at through the provided 360-degree image.

8. The processor-implemented method of claim 1, further comprising:
dividing a display area of the user device into a left area and a right area in response to an input by the user device and equally displaying, on the left area and the right area, the same image as a 360-degree image displayed before the input by the user device after the providing of a virtual reality image.

9. The processor-implemented method of claim 1, wherein the plurality of gaze densities are determined by applying, as a weighting, at least one of the number of users' gazes fixed on each area in the virtual reality image for a predetermined period of time, a period of time for a user gaze path to be fixed, and the number of times of being passed through by a user gaze path on move.

10. The processor-implemented method of claim 1, wherein in the providing of interest information of at least one user about the object,
a subdivision area with a gaze density equal to or higher than a threshold value from among multiple subdivision areas included in the output area is displayed by applying a predetermined color on the basis of the plurality of gaze densities, and
the heatmap image is applied with colors differently set for multiple gaze density ranges, respectively.

11. The processor-implemented method of claim 1, wherein the providing of the interest information of at least one user about the object includes:
collecting the plurality of gaze densities as lookup results of a virtual reality image about the same object from the at least one user device to produce collected gaze densities;

respectively matching the collected gaze densities with the same-density areas in the virtual reality image to produce matched gaze densities; and generating a heatmap image of the virtual reality image by applying the matched gaze densities.

12. The processor-implemented method of claim 11, wherein the step of providing of interest information of at least one user about the object includes:

generating the heatmap image on the basis of the plurality of gaze densities for the at least one user device accumulated at a predetermined interval for a predetermined period of time; and generating heatmap history data in which heatmap images generated at the predetermined interval are consecutive with respect to a time axis.

13. The processor-implemented method of claim 12, further comprising:

after the step of generating of generating heatmap history data, providing a user interface including a menu bar for selecting a temporal location of a heatmap image to be displayed on an output window while displaying the heatmap history data on the output window.

14. A server for providing a virtual reality image about an object, the server comprising:

a non-transitory computer readable medium storing a program for executing a processor-implemented method of claim 1.

15. The server of claim 14, wherein the input to change the direction by the user device is at least one of a touch input, an input of a pointer trajectory value, an input of the user's gesture, and an input of a displacement value caused by a change in location of the user device.

16. The server of claim 14, wherein execution of the program by the processor causes the processor to:

estimate locations of the user gaze path within the provided virtual reality image on the basis of an output area of a screen of the user device on which the virtual reality image provided to the user device is displayed, wherein the interest information is a virtual reality image displayed as being overlapped with a heatmap image generated on the basis of the plurality of gaze densities.

17. A processor-implemented method for providing a virtual reality image about an object performed, the processor-implemented executable by a server, the method comprising:

receiving, by a processor of the server, a lookup request for the virtual reality image about the object selected by a user device in communication with the server;

providing, by the processor, the virtual reality image for display by the user device, the virtual reality image including one or more 360-degree images corresponding to the object to the user device, wherein the one or more 360-degree image comprise image data about views from multiple directions from a photographing location of the image, and wherein the image data about views from multiple directions comprises image data about a view from one direction and also provided with image data about a view from another direction in response to an input to change a direction by the user device;

determining, by the processor, a plurality of gaze densities for a plurality of areas included in the virtual reality image based on a user gaze path with respect the user device, each of the plurality of gaze densities comprising a frequency value corresponding to locations of the user gaze path from among the plurality of areas, each of the plurality of gaze densities increasing as the corresponding frequency value increases;

providing, by the processor, interest information for display by the user device with the virtual reality image, the interest information overlapping the virtual reality image based on the plurality of gaze densities; and estimating the locations of the user gaze path within the virtual reality image on the basis of an output area of a screen of the user device on which the virtual reality image is displayed, wherein the interest information comprises a virtual reality image displayed as being overlapped with a heatmap image generated on the basis of the plurality of gaze densities, wherein the estimating of the locations of the user gaze path comprises: receiving a pointer trajectory value about the virtual reality image from the user device; detecting the output area on the basis of the pointer trajectory value; determining a central area of the detected output area as the locations of the user gaze path; and estimating a combination of the determined locations of the user gaze path, and wherein the plurality of gaze densities are determined by applying, as a weighting, at least one of the number of users' gazes fixed on each area in the virtual reality image for a predetermined period of time, a period of time for a user gaze path to be fixed, and the number of times of being passed through by a user gaze path on move.

18. A server for providing a virtual reality image about an object, the server comprising:

a non-transitory computer readable medium storing a program for executing a processor-implemented method of claim 17.

* * * * *